(12) United States Patent
Xiang et al.

(10) Patent No.: US 9,698,694 B2
(45) Date of Patent: Jul. 4, 2017

(54) CONTROL CIRCUITS AND METHODS FOR REGULATING OUTPUT VOLTAGES BASED ON ADJUSTABLE REFERENCES VOLTAGES

(71) Applicant: Astec International Limited, Kowloon (HK)

(72) Inventors: Mao Xi Xiang, Shenzhen (CN); Jian Zhen Ma, Shenzhen (CN); YuanDong He, Shenzhen (CN); HongLian Fang, Shenzhen (CN)

(73) Assignee: ASTEC INTERNATIONAL LIMITED, Kwun Tong, Kowloon (HK)

( * ) Notice: Subject to any disclaimer, the term of this patent is extended or adjusted under 35 U.S.C. 154(b) by 143 days.

(21) Appl. No.: 14/372,939

(22) PCT Filed: Jan. 10, 2014

(86) PCT No.: PCT/CN2014/070440
§ 371 (c)(1),
(2) Date: Jul. 17, 2014

(87) PCT Pub. No.: WO2015/103766
PCT Pub. Date: Jul. 16, 2015

(65) Prior Publication Data
US 2015/0200595 A1    Jul. 16, 2015

(51) Int. Cl.
*H02M 3/335* (2006.01)
*H02M 3/22* (2006.01)
*H02M 1/00* (2006.01)

(52) U.S. Cl.
CPC ......... *H02M 3/22* (2013.01); *H02M 3/33507* (2013.01); *H02M 3/33592* (2013.01); *H02M 2001/0025* (2013.01); *Y02B 70/1475* (2013.01)

(58) Field of Classification Search
CPC ............... H02M 3/22; H02M 3/33507; H02M 3/33592; H02M 2001/0025;
(Continued)

(56) References Cited

U.S. PATENT DOCUMENTS 7,072,190 B2   7/2006   Schlecht
7,269,034 B2   9/2007   Schlecht
(Continued)

FOREIGN PATENT DOCUMENTS

CN   1592059 A    3/2005
CN   101394132    3/2009
(Continued)

OTHER PUBLICATIONS

"Intelligent Energy Management for Improved Efficiency," Ericsson, Jun. 2010, pp. 1-12.

*Primary Examiner* — Emily P Pham
*Assistant Examiner* — Shahzeb K Ahmad
(74) *Attorney, Agent, or Firm* — Harness, Dickey & Pierce, P.L.C.

(57) ABSTRACT

Control circuits are provided for regulating an output voltage of a switched mode power supply having a variable input voltage and at least one power switch. The control circuits are operable to generate a comparison voltage based on the output voltage of the switched mode power supply and a duty cycle of a control signal provided to the at least one power switch, determine a reference voltage based on whether the generated comparison voltage falls within one of a plurality of voltage ranges, and adjust the duty cycle of the control signal provided to the at least one power switch of the switched mode power supply as a function of the determined reference voltage and the output voltage. Each voltage range is associated with a different reference voltage. Switched mode power supplies including the control circuits and methods implemented by the control circuits are also disclosed.

22 Claims, 8 Drawing Sheets

(58) Field of Classification Search
CPC . H02M 2001/0003; H02M 2001/0029; H02M 2001/0048; H02M 3/156; H02M 3/158; H02M 3/1582; H02M 3/315; H02M 3/335; H02M 3/33515; H02M 3/33523; H02M 3/33538; H02M 3/337; Y02B 70/1475

See application file for complete search history.

(56) References Cited

U.S. PATENT DOCUMENTS

| | | | |
|---|---|---|---|
| 7,272,021 B2 | 9/2007 | Schlecht et al. | |
| 7,453,709 B2 | 11/2008 | Park et al. | |
| 7,502,236 B2 | 3/2009 | Baurle et al. | |
| 7,558,083 B2 | 7/2009 | Schlecht | |
| 7,564,702 B2 | 7/2009 | Schlecht | |
| 7,787,261 B2 | 8/2010 | Farrington et al. | |
| 8,149,597 B2 | 4/2012 | Farrington et al. | |
| 8,193,790 B2* | 6/2012 | Asuncion | H02M 3/156 323/282 |
| 8,493,751 B2 | 7/2013 | Schlecht | |
| 8,791,676 B2* | 7/2014 | Liu | G06F 1/26 323/282 |
| 2010/0289467 A1 | 11/2010 | Wu et al. | |
| 2011/0187396 A1 | 8/2011 | Jarrige et al. | |
| 2013/0202061 A1 | 8/2013 | Chandrasekaran | |
| 2015/0055375 A1* | 2/2015 | Karlsson | H02M 3/33592 363/17 |
| 2015/0078041 A1* | 3/2015 | Huang | H02M 1/4258 363/21.18 |
| 2015/0115717 A1 | 4/2015 | Horng et al. | |
| 2015/0303803 A1* | 10/2015 | Chen | H02M 3/158 323/271 |

FOREIGN PATENT DOCUMENTS

| | | |
|---|---|---|
| CN | 102969896 A | 3/2013 |
| CN | 103036420 | 4/2013 |
| CN | 103163928 | 6/2013 |
| CN | 103208921 A | 7/2013 |
| WO | 2009/059527 | 5/2009 |
| WO | 2012/116750 | 9/2012 |
| WO | 2012/143050 | 10/2012 |
| WO | 2013/113354 | 8/2013 |
| WO | 2013/156079 | 10/2013 |

* cited by examiner

CONTROL CIRCUITS AND METHODS FOR REGULATING OUTPUT VOLTAGES BASED ON ADJUSTABLE REFERENCES VOLTAGES

FIELD

The present disclosure relates to control circuits and methods for regulating output voltages based on adjustable reference voltages.

BACKGROUND

This section provides background information related to the present disclosure which is not necessarily prior art.

Switched mode power supplies may include power switches and pulse width modulated (PWM) control for controlling the power switches. Generally, the output voltage of the power supplies is regulated by controlling the duty cycle based on the sensed variable input voltage, the sensed output voltage and the transformer turns ratio n (if employed). In other switched mode power supplies, a reference voltage may be adjusted based on the sensed variable input voltage to regulate the output voltage.

SUMMARY

This section provides a general summary of the disclosure, and is not a comprehensive disclosure of its full scope or all of its features.

According to one aspect of the present disclosure, a control circuit is provided for regulating an output voltage of a switched mode power supply having a variable input voltage and at least one power switch. The control circuit is operable to generate a comparison voltage based on the output voltage of the switched mode power supply and a duty cycle of a control signal provided to the at least one power switch, determine a reference voltage based on whether the generated comparison voltage falls within one of a plurality of voltage ranges, and adjust produce the duty cycle of the control signal provided to the at least one power switch of the switched mode power supply as a function of the determined reference voltage and the output voltage. Each voltage range is associated with a different reference voltage.

Accordingly to another aspect of the present disclosure, a method is provided for regulating an output voltage of a switched mode power supply having a variable input voltage and at least one power switch. The method includes generating a comparison voltage based on the output voltage of the switched mode power supply and a duty cycle of a control signal provided to the at least one power switch, determining a reference voltage based on whether the generated comparison voltage falls within one of a plurality of voltage ranges, and adjusting the duty cycle of the control signal provided to the at least one power switch of the switched mode power supply as a function of the determined reference voltage and the output voltage. Each voltage range is associated with a different reference voltage.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Figure 1:
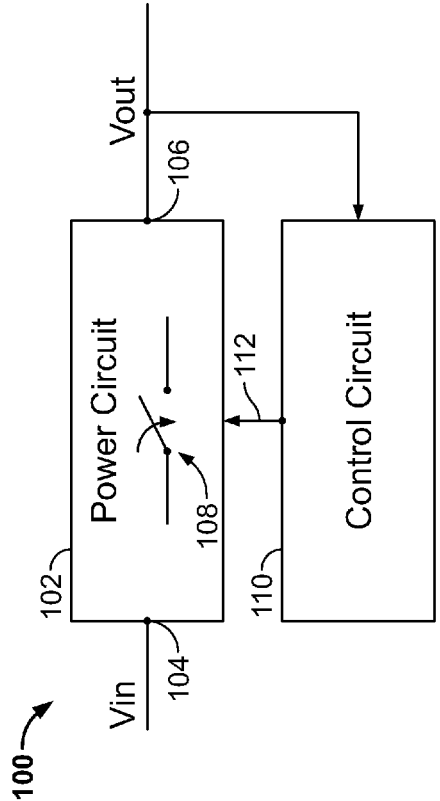
FIG. 1 is a block diagram of a switched mode power supply including a power circuit and a control circuit according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an" and the may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to one aspect of the present disclosure, methods are provided for regulating an output voltage of a switched mode power supply (SMPS) having a variable input voltage and at least one power switch. The methods may include, for example, generating a control signal having a duty cycle for the at least one power switch using a reference voltage and adjusting the reference voltage to adjust the duty cycle of the control signal for the at least one power switch of the SMPS. The reference voltage may be a function of the duty cycle of the control signal.

In other embodiments, the methods of regulating the output voltage of the SMPS having a variable input voltage and at least one power switch may include, for example, generating a comparison voltage based on the output voltage of the SMPS and a duty cycle of a control signal provided to the at least one power switch, determining a reference voltage based on whether the generated comparison voltage falls within one of a plurality of voltage ranges, and adjusting the duty cycle of the control signal provided to the at least one power switch of the SMPS as a function of the determined reference voltage and the output voltage. Each voltage range is associated with a different reference voltage.

Additionally and as further explained below, the methods may optionally include generating the comparison voltage based on a sensed input current of the power circuit or a sensed output current of the power circuit, generating the comparison voltage a defined period of time after the reference voltage is determined, etc.

By adjusting the duty cycle as a function of differing reference voltages as noted above, both the duty cycle and the reference voltage may change when needed. This allows regulation of the output voltage of the power circuit regardless of any changes in the input voltage of the power circuit. Thus, the output voltage may be regulated without sensing or otherwise determining the input voltage.

Further, by changing the reference voltage, the new duty cycle for the control signal may remain sufficiently high (e.g., about 97%). As a result, the efficiency of the power circuit, a switched mode power supply (SMPS) including the power circuit, etc. may be sufficiency high (e.g., about 96.8%).

The methods disclosed herein may be implemented by a control circuit including, for example, any of the control circuits disclosed herein. For example, FIG. 1 illustrates a SMPS according to one example embodiment of the present disclosure and is indicated generally by reference number 100. As shown in FIG. 1, the SMPS 100 includes a power circuit 102 having an input 104, an output 106 and at least one power switch 108 coupled between the input 104 and the output 106, and a control circuit 110 coupled to the power circuit 102 for providing a control signal 112 having a duty cycle to the at least one power switch 108 for regulating an output voltage Vout at the output 106 of the power circuit 102 regardless of any changes in an input voltage Vin at the input 104 of the power circuit 102. Thus, the control circuit 110 regulates the output voltage Vout of the SMPS 100 which may have a variable input voltage Vin. The control circuit 110 of FIG. 1 may be operable to perform the methods disclosed herein.

Figure 2:
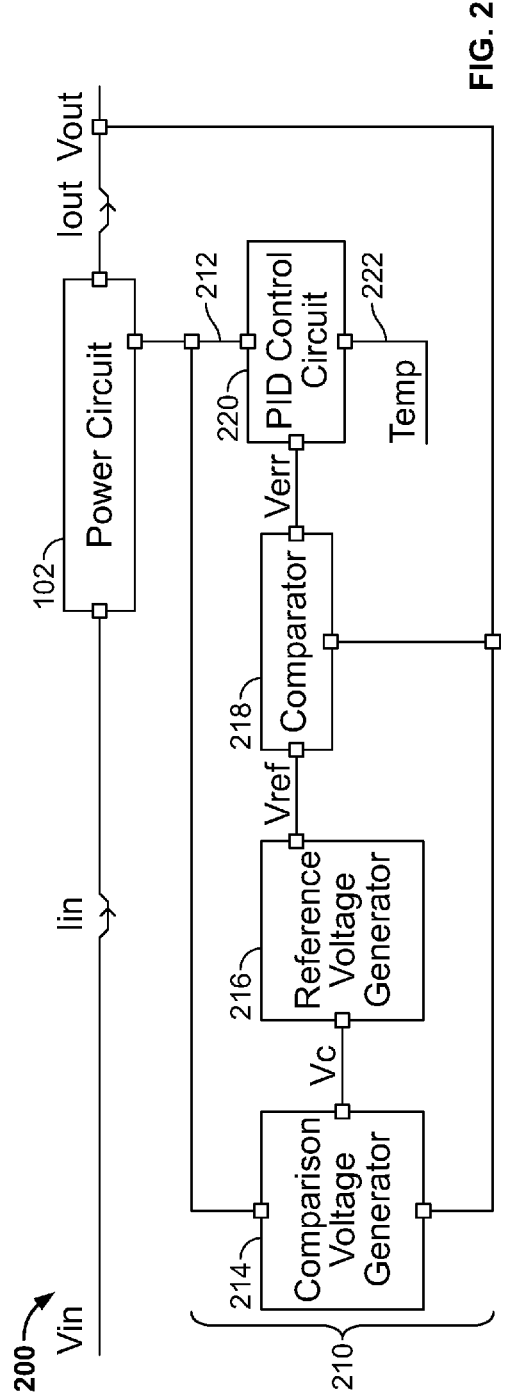
FIG. 2 is a block diagram of a switched mode power supply including a power circuit and a control circuit having various control circuit components according to another example embodiment.

FIG. 2 illustrates an example SMPS 200 including the power circuit 102 of FIG. 1 and a control circuit 210 for regulating an output voltage Vout of the SMPS 200 (via, e.g., a control signal 212). In the example of FIG. 2, the power circuit 102 may include an isolation transformer having a turns ratio n and at least one power switch, both of which are not shown for clarity.

As shown in FIG. 2, the control circuit 210 includes control components for regulating and changing (if needed) the output voltage Vout. The components include a comparison voltage generator 214, a reference voltage generator 216, a comparator 218 and a proportional-integral-derivative (PID) control circuit 220.

The output voltage Vout may be regulated and/or changed based on the following PWM control equation:

$$Vout = D * Vin/n \qquad (1)$$

where D is the duty cycle of the control signal 212. In some preferred embodiments, the turns ratio n of the isolation transformer is low (e.g., a 1:1 turns ratio). Alternatively, the turns ratio n may be any other suitable ratio depending on the DC-DC converter, the control circuit, desired results, etc.

As shown in FIG. 2, the comparison voltage generator 214 receives the output voltage Vout and the duty cycle D (via the control signal 212). Based on the output voltage Vout and the duty cycle D, the comparison voltage generator 214 generates a comparison voltage Vc. In the example of FIG. 2, the comparison voltage Vc is determined by the following equation:

$$Vc = k*Vout/D \quad (2)$$

where k is a defined coefficient used to scale the comparison voltage Vc so that the comparison voltage Vc may be within a desired range. In some examples, if k is too low, the SMPS 200 may not operate as desired. Generally, the defined coefficient k is set according to the capabilities and/or characteristics of the control circuit 210.

To keep the output voltage Vout fully regulated and/or to change the output voltage Vout when the input voltage Vin and/or a load (not shown) changes, the output voltage Vout may be determined based on a piecewise function as further explained below. To accomplish this, a reference voltage for setting the output voltage Vout (further explained below) may indirectly reflect the input voltage Vin without sensing or otherwise determining the input voltage Vin.

For example, equation (1) may be rewritten to solve for the input voltage Vin (i.e., Vin=n*Vout/D). Because the turns ratio n is constant, the input voltage Vin is proportional to the output voltage Vout and the duty cycle D. Similarly and as shown in Equation (2), because the defined coefficient k is constant, the comparison voltage Vc is proportional to the output voltage Vout and the duty cycle ID. Thus, because both the input voltage Vin and the comparison voltage Vc are proportional to the output voltage Vout and the duty cycle ID, the comparison voltage Vc which is used in determining the reference voltage (as explained below) may indirectly reflect the input voltage Vin without sensing or otherwise determining the input voltage Vin.

As shown in FIG. 2, the comparison voltage Vc is provided to the reference voltage generator 216 which determines a reference voltage Vref based on whether the generated comparison voltage Vc falls within a particular voltage range. In the example of FIG. 2, the reference voltage generator 216 includes a piecewise function to determine the reference voltage Vref. For example, the piecewise function may be as follows:

$$Vref=k1, \text{ if } a0<Vc<a1$$

$$Vref=k2, \text{ if } a1<=Vc<a2$$

$$Vref=k3, \text{ if } a2<=Vc<a3$$

$$Vref=k4, \text{ if } Vc>=a3 \quad (3)$$

where a0, a1, a2 and a3 are coefficients for defining voltage ranges while k1, k2, k3 and k4 are defined coefficients that may be set according to the defined voltage ranges. In some embodiments, the coefficients a0, a1, a2, a3, k1, k2, k3 and k4 are defined according to actual operating conditions of the SMPS 200, the power circuit 102, etc.

Additionally, as shown in equation (3), the voltage ranges (e.g., a0<Vc<a1, a1<=Vc<a2, etc.) are contiguous ranges. Alternatively, the voltage ranges may be noncontiguous ranges as further explained below.

The comparator 218 of FIG. 2 receives the determined reference voltage Vref from the reference voltage generator 216 and compares the reference voltage Vref with the output voltage Vout. In response, the comparator 218 may generate an error signal Verr based on the difference between the determined reference voltage Vref and the output voltage Vout of the SMPS 200.

The PID control circuit 220 may calculate a new duty cycle (e.g., adjust the duty cycle D) for the control signal 212 based the error signal Verr to control the power switch(es) of the power circuit 102. Alternatively, the control circuit 210 may include one or more other control components in addition to or in place of the PID control circuit 220 for calculating the new duty cycle, generating the control signal 212, etc.

Additionally, and as shown in FIG. 2, the control circuit 210 may optionally sense a temperature in the SMPS 200, the power circuit 102, etc. The PID control circuit 220 may receive the sensed temperature (via signal 222) and adjust the duty cycle for the control signal 212 as a function of the sensed temperature. Thus, the control circuit 210 may implement temperature compensation when generating the control signal 212.

The control process of FIG. 2 may be repeated as desired. For example, the control circuit 210 may successively generate the comparison voltage Vc, determine the reference voltage Vref based on whether the generated comparison voltage falls within one of the voltage ranges, and adjust the duty cycle.

Additionally and/or alternatively, a delay (e.g., a defined period of time) may be added to the control process to ensure the reference voltage Vref is calculated based on a duty cycle and an output voltage Vout of the same sequence. For example, the control circuit 210 may generate the comparison voltage Vc a defined period of time after the reference voltage Vref is determined (e.g., after the reference voltage Vref is initially set at startup, while the power circuit 102 is operating, etc.). The defined period of time allows the power circuit 102 enough time to respond to a possible adjusted reference voltage Vref and change the output voltage Vout accordingly before sensing the output voltage. In some situations, if a delay is not employed, the relationship between the reference voltage Vref and the output voltage Vout may deviate causing the output voltage Vout to oscillate.

The defined period of time may be any suitable amount of time to ensure the reference voltage Vref is calculated based on a duty cycle and an output voltage Vout of the same sequence.

By way of example only, the input voltage Vin of the SMPS 200 may be 48V, the output voltage Vout may be 11 V and the reference voltage Vref may be initially set to k2 at a no load condition. If the load is increased, the duty cycle is increased to ensure the output voltage Vout is stable. Otherwise, if the duty cycle is fixed, inherent voltage drops (further explained below) may cause the output voltage Vout to undesirably decrease. When the duty cycle is increased, the comparison voltage Vc will decrease as shown above with reference to equation (2). If the comparison voltage Vc is less than a1, the initially set reference voltage Vref may change from k2 to k1 as shown above with reference to equation 0 j. As the reference voltage Vref decreases, the output voltage Vout decreases accordingly. For example, when the reference voltage Vref is equal to k1, the output voltage Vout may decrease from 11 V to 10V.

In some preferred embodiments, the reference voltage Vref may change (e.g., from k2 to k1) gradually. Alternatively, the reference voltage Vref may change immediately if desired.

As apparent to those skilled in the art, the power circuits disclosed herein may include impedance (e.g., inherent impedance from traces, resistance of transformer windings, resistance of the power switches, soldering resistances, etc.) that may cause internal voltage drops in the power circuits of the switched mode power supplies. For simplicity, the impedance is not reflected in the above explained equations. Thus, the above equations may be modified to include the internal voltage drops which may change based on a load current. Accordingly, the reference voltage used for setting the output voltage Vout may continue to indirectly reflect the input voltage.

For example, the PWM control equation (1) explained above may be modified as follows:

$$Vout+Rout*Iout=(Vin-Rin*Iin)*D/n \quad (4)$$

Where n is a turns ratio of an isolation transformer, Rin is the primary side impedances. Rout is the secondary side impedances, Iin is the input current (e.g., a switching current, an average current, etc.), and Iout is the output current (e.g., a switching current, an average current, etc.).

As shown below, equation (4) above may be rearranged to solve for the input voltage Vin.

$$Vin=(Vout*n)/D+Rin*Iin+(Rout*Iout*n)/D. \quad (5)$$

Additionally, because the output current Iout may be equal to the turns ratio n multiplied by the input current Iin, equation (5) may be expressed as the following equations:

$$Vin=(Vout*n)/D+[Rin+(Rout*n*n)/D]*Iin \quad (6)$$

$$Vin=(Vout*n)/D+[Rin/n+(Rout*n)/D]*Iout. \quad (7)$$

As shown above, the equations (6) and (7) include a load current component (e.g., based on the input current Iin or the output current Iout) not included in the PWM control equation (1) explained above. Thus, a modified comparison voltage Vc' based on load compensation may include the comparison voltage Vc calculated above in equation (2) and a load current component based on, for example, the input current Iin or the output current Iout. The modified comparison voltage Vc' may be determined by the following equations:

$$Vc'=k*Vout/D+k6*Iin \quad (8)$$

$$Vc'=k*Vout/D+k5*Iout \quad (9)$$

Similar to the piecewise equation (3) above, the modified comparison voltage Vc' may be piecewised to determine the reference voltage Vref. For example, the piecewise function for the modified comparison voltage Vc' may be as follows:

$$Vref=k1, \text{ if } a0<Vc'<a1$$

$$Vref=k2, \text{ if } a1<=Vc'<a2$$

$$Vref=k3, \text{ if } a2<=Vc'<a3$$

$$Vref=k4, \text{ if } Vc'>=a3 \quad (10)$$

Figure 3:
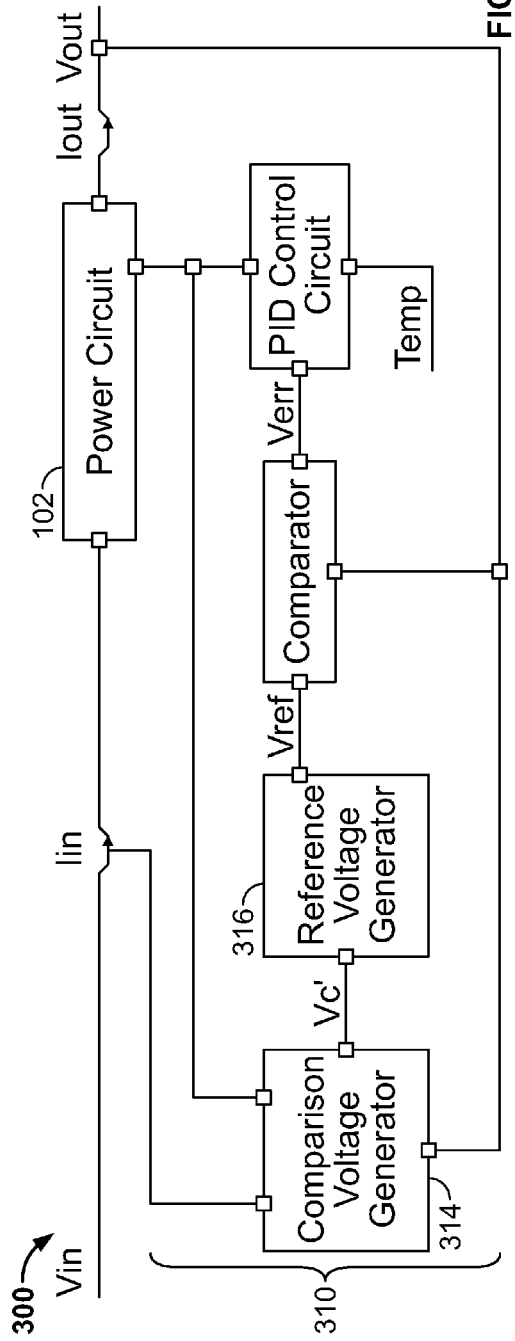
FIG. 3 is a block diagram of a switched mode power supply including a power circuit and a control circuit including load compensation based on an input current according to yet another example embodiment.

FIG. 3 illustrates an example SMPS 300 including the power circuit 102 of FIG. 1 and a control circuit 310 similar to the control circuit 210 of FIG. 2. The control circuit 310, however, senses an input current Iin of the power circuit 102. The control circuit 310 also includes a comparison voltage generator 314 and a reference voltage generator 316 similar to the comparison voltage generator 214 and the reference voltage generator 216 of FIG. 2. The comparison voltage generator 314, however, generates a comparison voltage Vc' based on the input current In of the power circuit 102 in addition to the duty cycle and the output voltage Vout by employing, for example, equation (8) above. The reference voltage generator 316 may utilize the piecewise function of equation (10) to determine a reference voltage Vref as explained above.

Figure 4:
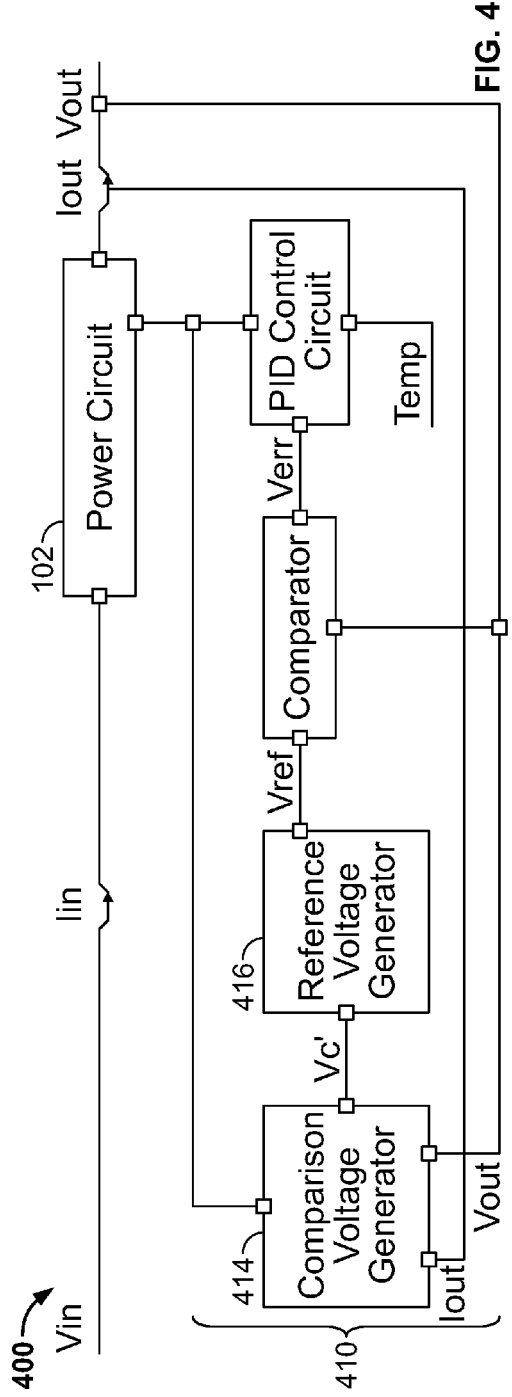
FIG. 4 is a block diagram of a switched mode power supply including a power circuit and a control circuit including load compensation based on an output current according to another example embodiment.

FIG. 4 illustrates another example SMPS 400 similar to the SMPS 300 of FIG. 3. The SMPS 400 includes a control circuit 410 having a comparison voltage generator 414 and a reference voltage generator 416. The control circuit 410 senses an output current Iout of the power circuit 102 and the comparison voltage generator 414 generates a comparison voltage Vc' based on the output current Iout of the power circuit 102 in addition to the duty cycle and the output voltage Vout by employing, for example, equation (9) above. The reference voltage generator 416 may utilize the piecewise function of equation (10) to determine a reference voltage Vref as explained above.

Figure 5:
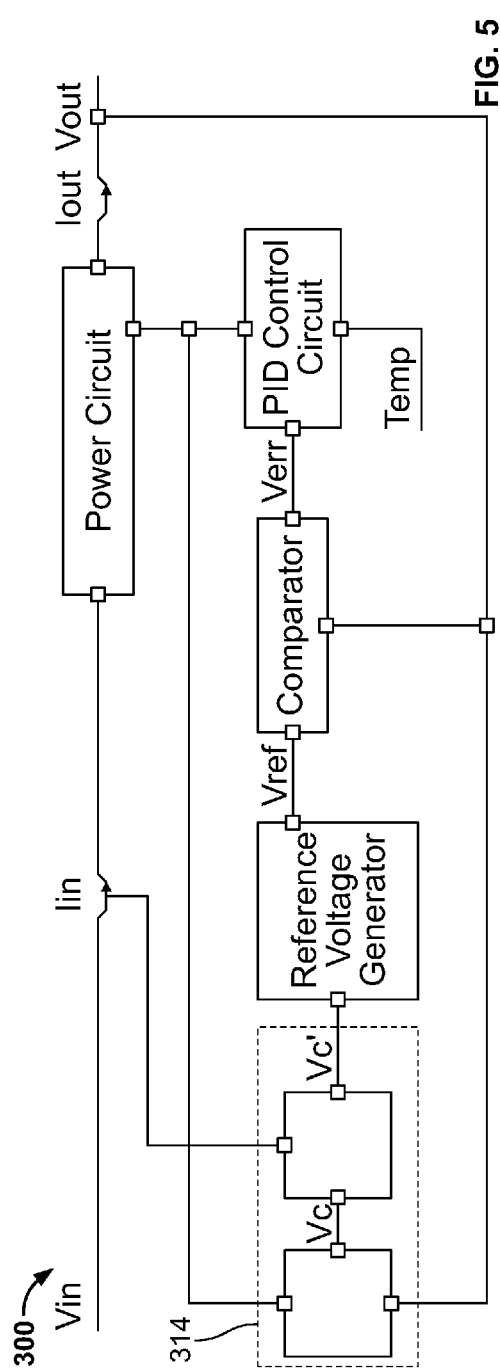
FIG. 5 is a block diagram of the switched mode power supply of FIG. 3 including multiple control circuit components for generating a comparison voltage.
Figure 6:
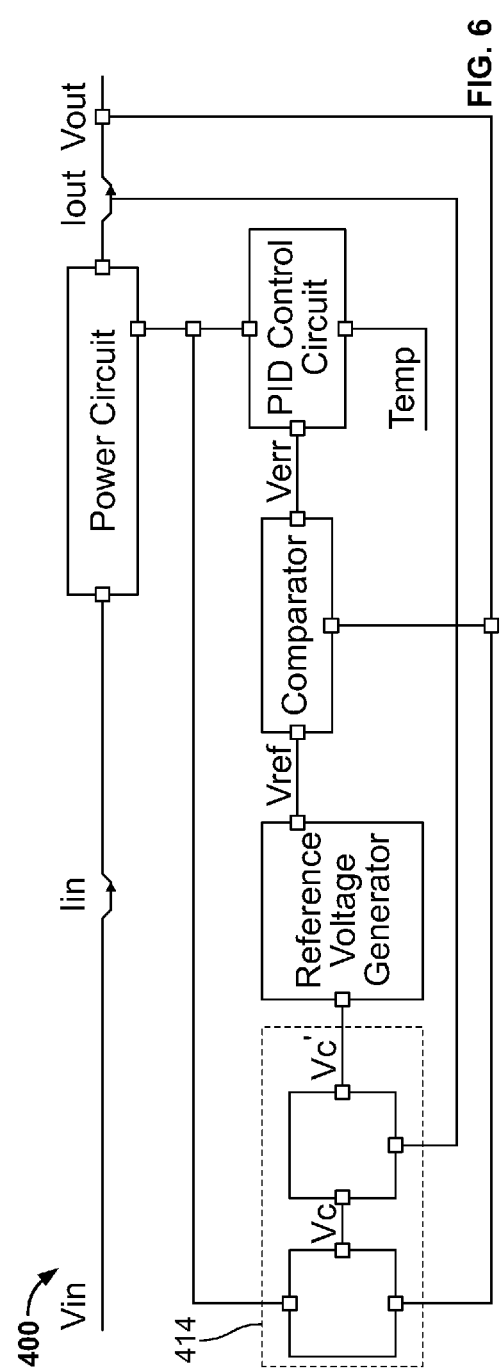
FIG. 6 is a block diagram of the switched mode power supply of FIG. 4 including multiple control circuit components for generating a comparison voltage.

In some embodiments, the comparison voltage generator 314 of FIG. 3 and the comparison voltage generator 414 of FIG. 4 may include more than one component for generating the comparison voltage Vc'. For example, FIG. 5 illustrates the comparison voltage generator 314 including a component for receiving the duty cycle and the output voltage Vout for calculating a comparison voltage Vc according to equation (2) above and another component for receiving the comparison voltage Vc and the input current Iin to generate the modified comparison voltage Vc' according to equation (8) above. Similarly, FIG. 6 illustrates the comparison voltage generator 414 including a component for receiving the duty cycle and the output voltage Vout for calculating the comparison voltage Vc according to equation (2) above and another component for receiving the comparison voltage Vc and the output current Iout to generate the modified comparison voltage Vc according to equation (9) above.

In some embodiments, load regulation may be improved by employing the load current compensation based on the input current Iin as shown in FIGS. 3 and 5 from about 0.5% to about 0.3%. Similarly, by employing the load current compensation based on the output current Iout as shown in FIGS. 4 and 6, load regulation may improve from about 0.5% to about 0.2%.

As noted above, some embodiments may include voltage ranges that are noncontiguous ranges. In some circumstances, the noncontiguous ranges may assist in reducing hysteresis. For example, during a transient condition, if both the input voltage and the load change, the output voltage may oscillate as the reference voltage Vref is adjusted. To avoid oscillation, the voltage ranges may include noncontiguous ranges. For example, the piecewise function of equation (3) explained above may be modified to include noncontiguous ranges as follows:

$$Vref=k1, \text{ if } a0+hs<Vc<a1-hs$$

$$Vref=k2, \text{ if } a1+hs<=Vc<a2-hs$$

$$Vref=k3, \text{ if } a2+hs<=Vc<a3-hs$$

$$Vref=k4, \text{ if } Vc<=a3+hs. \quad (11)$$

Similar modifications may be made to the piecewise function of equation (10) if desired. In some circumstances, the comparison voltage Vc, Vc' may fall between two of the noncontiguous ranges. For example, the comparison voltage Vc, Vc' may be greater than a1−hs but less than a1+hs (i.e., a1−hs<Vc, Vc'<a1+hs). In such cases, the reference voltage Vref may not change from its current value. For example, if the reference voltage Vref is k1 and the comparison voltage Vc, Vc' falls between a1−hs and a1+hs, the reference voltage Vref will remain at k1. Alternatively, if the comparison voltage Vo, Vc' falls between two of the noncontiguous ranges, the comparison voltage Vc, Vc' may be set to a preset value.

FIGS. 8A, 8B, 8C and 8D are example graphs illustrating the output voltage Vout according to the input voltage Vin of a SMPS (e.g., the SMPS(s) disclosed herein) and a particular load current (e.g., no load, 12.5 A, 25 A and 50 A). As shown in FIGS. 8A, 8B, 8C and 8D, the output voltage Vout is substantially regulated at about 10V, about 10.10V, about 12V and about 12.5V as the input voltage Vin of the power circuit changes between 42V and 60V. In the example graphs of FIGS. 8A, 8B, 8C and 8D, the output voltage Vout is determined based on load compensation (e.g., from a sensed input current, a sensed output current, etc.) as explained above.

Figure 9:
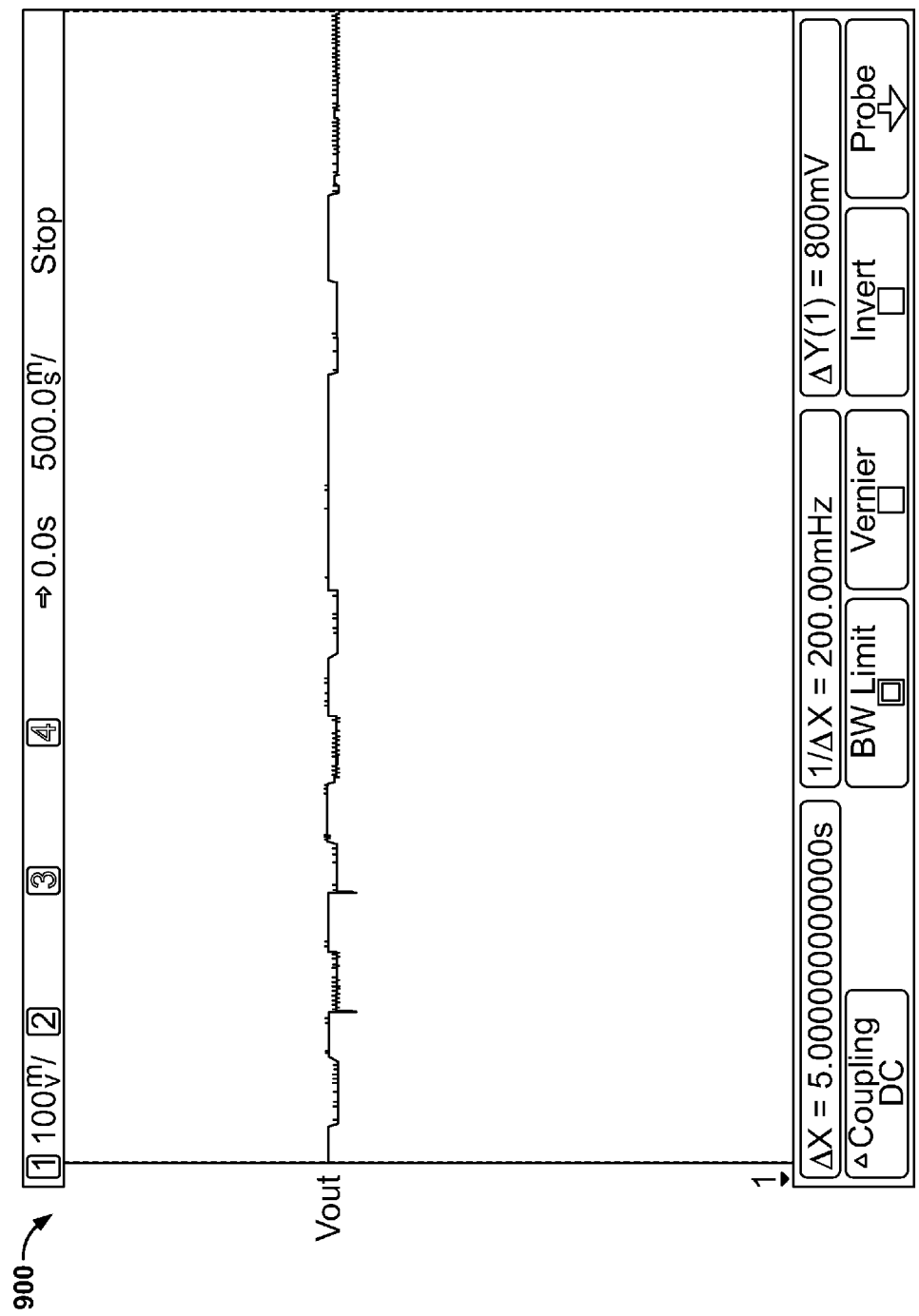
FIG. 9 is a graph including a regulated output voltage of a power circuit for a transient load according to yet another example embodiment.

FIG. 9 is an example graph 900 illustrating a regulated output voltage Vout for a transient load. In the example of FIG. 9, the regulated output voltage Vout is determined based a piecewised reference voltage Vref as explained above.

Figure 10:
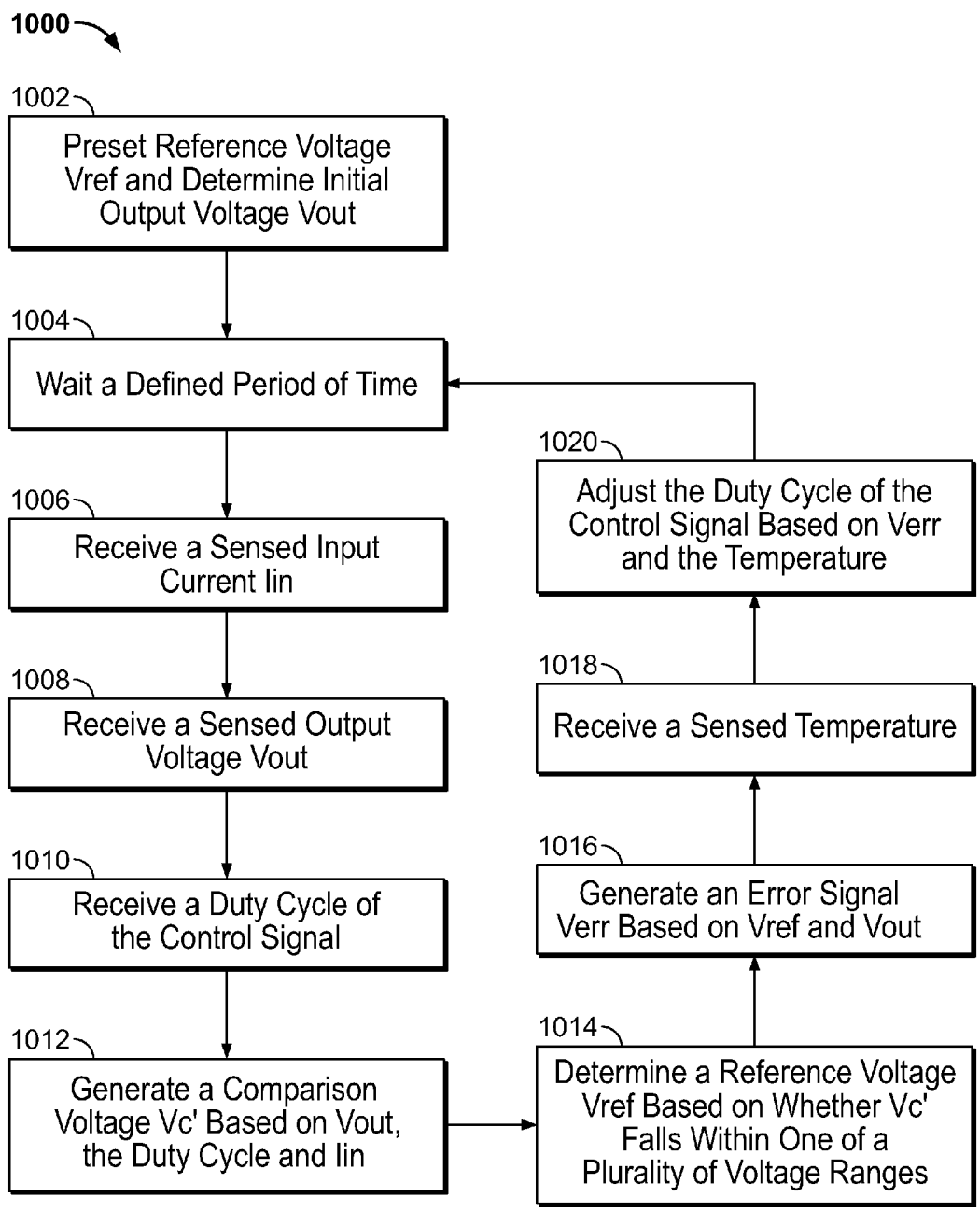
FIG. 10 is a flow diagram of a process implemented by a control circuit according to another example embodiment.

FIG. 10 is an example flow diagram of a process 1000 implemented by a control circuit employing the features disclosed herein. The process 1000 includes, in block 1002, presetting a reference voltage Vref and determining an initial output voltage Vout according to the preset reference voltage Vref. Presetting the reference voltage Vref and determining the initial output voltage Vout may be done, for example, at startup of the power circuit. After a defined period of time (block 1004), a sensed input current Iin (block 1006), a sensed output voltage Vout (block 1008) and a duty cycle (block 1010) are received. In block 1012, a comparison voltage Vc' is generated based on the sensed output voltage Vout, the duty cycle, and the sensed input current Iin. In block 1014, the reference voltage Vref is determined based on whether the comparison voltage Vc' falls within one of a plurality of voltage ranges as explained above. In block 1016, an error signal Verr is generated based on the reference voltage Vref and the output voltage Vout, and in block 1018, a sensed temperature is received. The duty cycle of the control signal may be adjusted based on the error signal Verr and the sensed temperature in block 1020. After the duty cycle is adjusted (e.g., a new duty cycle is produced), the process 1000 may again wait the defined period of time in block 1004 and proceed with the process.

It should be apparent to those skilled in the art that a process implemented by a control circuit may include less than all features described above with reference to the process 1000. For example, in some embodiments, a process may not include waiting a defined period of time, sensing a temperature, sensing an input current Iin, etc. Additionally, the process 1000 may include sensing an output current Iout (as explained above) instead of the input current Iin. Alternatively, the process 1000 may not sense the input current Iin or the output current Iout as explained above.

Figure 7:
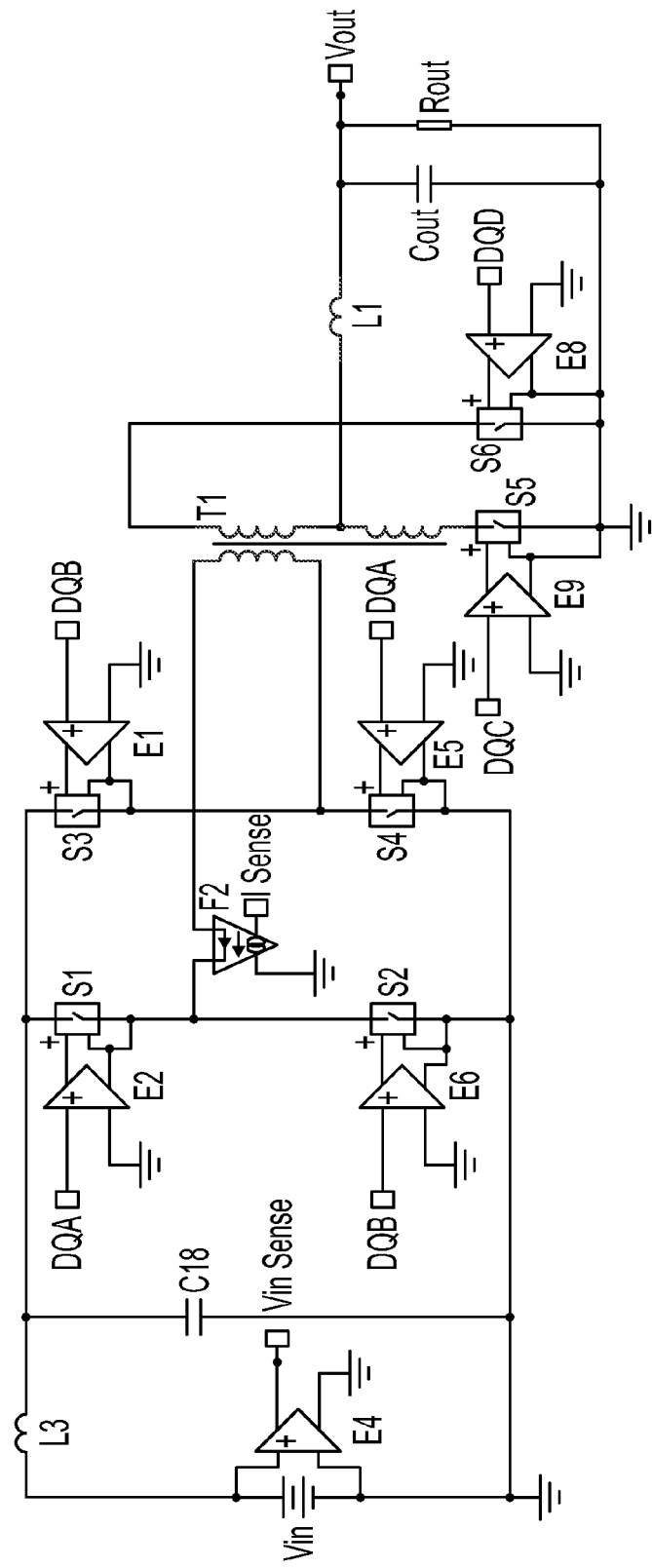
FIG. 7 is schematic diagram of a full bridge converter employable in the power circuits of FIGS. 1-6.
Figure 8A:
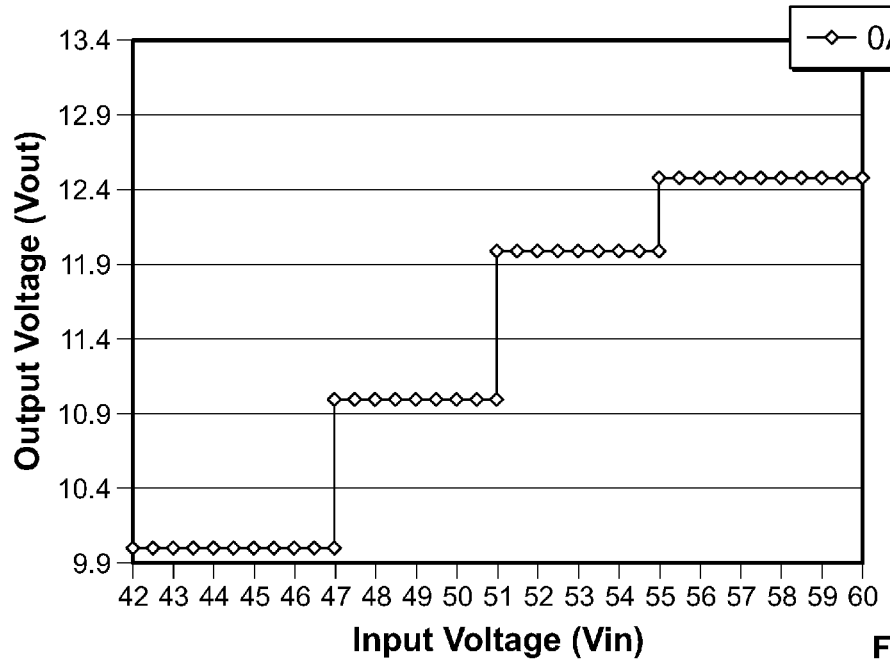
FIG. 8A is a graph including a regulated output voltage corresponding to a variable input voltage at no load according to another example embodiment.
Figure 8B:
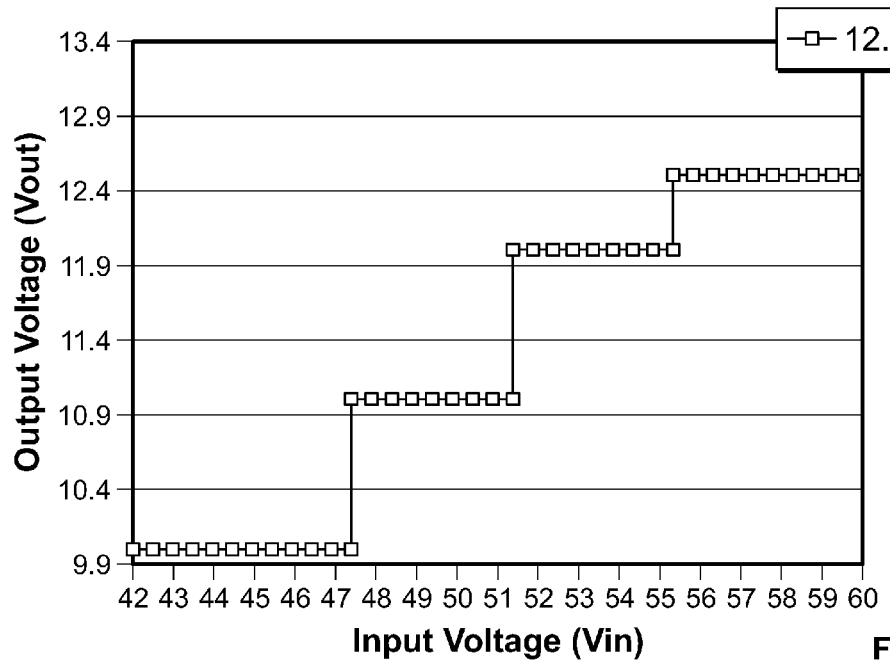
FIG. 8B is a graph including a regulated output voltage corresponding to a variable input voltage and a 12.5 A load current according to yet another example embodiment.
Figure 8C:
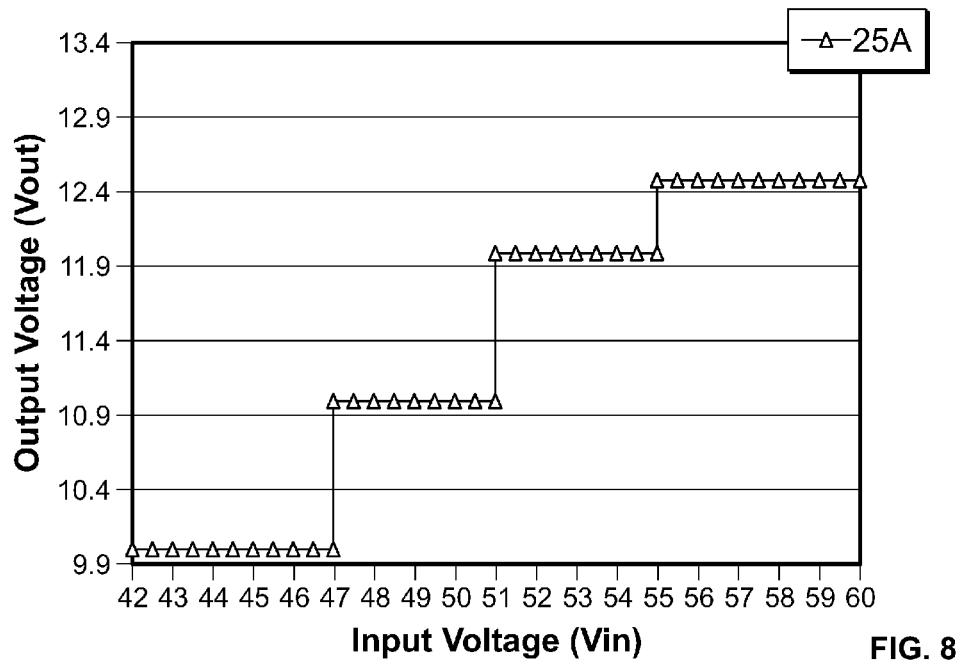
FIG. 8C is a graph including a regulated output voltage corresponding to a variable input voltage and a 25 A load current according to another example embodiment.
Figure 8D:
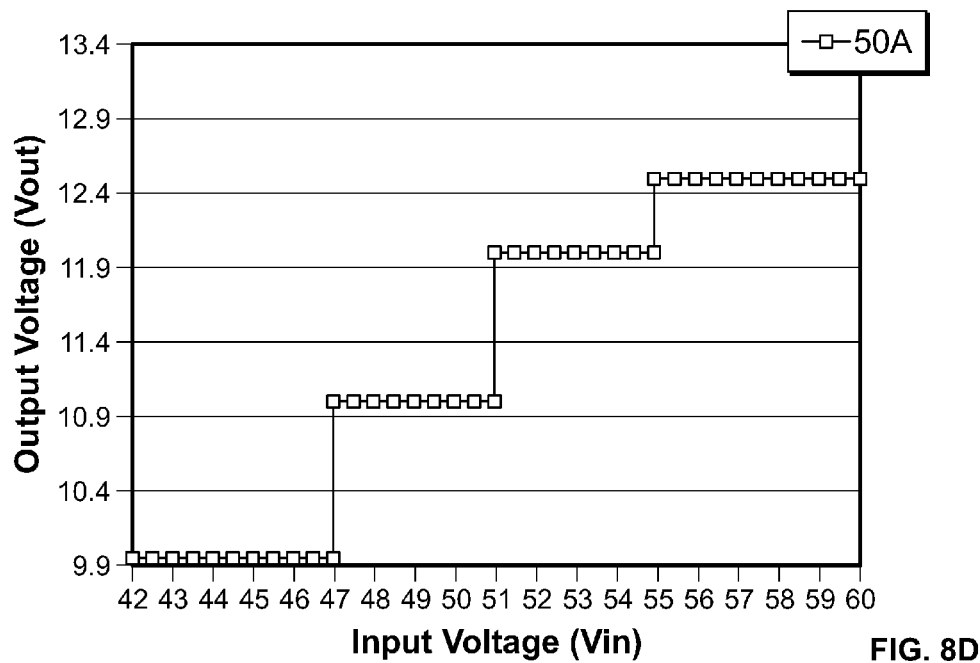
FIG. 8D is a graph including a regulated output voltage corresponding to a variable input voltage and a 50 A load current according to yet another example embodiment.

The power circuits disclosed herein may include any suitable DC-DC switching converter including, for example, a buck converter, a boost converter, a bridge converter (e.g., full bridge, half bridge, etc.), etc. For example, FIG. 7 illustrates a power circuit including a full bridge converter having power switches S1, S2, S3, S4 coupled to an isolation transformer T1. Additionally, although the equations explained above reference a turns ratio n of an isolation transformer, the power circuits may include non-isolated converter(s) and thus not include a transformer. In such cases, the turns ratio n of the above equations may be omitted.

The control circuits disclosed herein may include an analog control circuit, a digital control circuit (e.g., a digital signal processor (DSP), a microprocessor, a microcontroller, etc.), or a hybrid control circuit (e.g., a digital control circuit and an analog control circuit). For example, the delay (e.g., the defined period of time) disclosed herein may be programmed into the digital control circuit. Alternatively, the analog control circuit may include circuitry to create the delay. Additionally, the entire control circuit, some of the control circuit, or none of the control circuit may be an integrated circuit (IC).

The voltage ranges disclosed herein may be any suitable number of voltage ranges, including for example, two or more voltage ranges, at least three voltage ranges, at least four voltage ranges, only three voltage ranges, only four voltage ranges, etc. In some examples, increasing the number of voltage ranges may create a smoother transient with a longer recovery time. The control implementation, however, may become more complicated with an increased number of voltage ranges. Alternatively, if the number of voltage ranges is lower, the transient may be faster and the control implementation may be less complicated.

The output voltage Vout disclosed herein may be the actual (e.g., sensed, etc.) output voltage. Alternatively, the output voltage Vout may be scaled to a value proportional to the actual output voltage. For example, if the actual output voltage is high, the actual output voltage may be multiplied by a coefficient set to a value less than one. Alternatively, if the actual output voltage is low, the actual output voltage may be multiplied by a coefficient set to a value more than one. In some embodiments, the actual output voltage may be scaled through a resistor divider. Thus, the comparators disclosed herein and the comparison voltage generators disclosed herein may receive the actual output voltage, a scaled value of the actual output voltage, etc.

By employing the control circuits disclosed herein, the SMPS including the power circuits may operate at a higher duty cycle (as explained above) and thus at a higher efficiency (as explained above). Additionally, a power density of a SMPS including the control circuits may be increased. For example, the power density may be increased by not including components to sense or otherwise determine the input voltage. Further, by employing the control circuits, the output ripple current may be reduced and therefore a value of an output choke of the power circuit may be reduced.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A control circuit for regulating an output voltage of a switched mode power supply having a variable input voltage and at least one power switch, the control circuit operable to generate a comparison voltage based on the output voltage of the switched mode power supply and an adjustable duty cycle of a control signal provided to the at least one power switch; determine a constant reference voltage based on whether the generated comparison voltage falls within one of a plurality of voltage ranges, each voltage range associated with a different constant reference voltage; and adjust the duty cycle of the control signal provided to the at least one power switch of the switched mode power supply as a function of the determined constant reference voltage and the output voltage.

2. The control circuit of claim 1 wherein the control circuit is operable to sense an input current of the switched mode power supply and wherein the control circuit is operable to generate the comparison voltage based on the input current of the switched mode power supply.

3. The control circuit of claim 1 wherein the control circuit is operable to sense an output current of the switched mode power supply and wherein the control circuit is operable to generate the comparison voltage based on the output current of the switched mode power supply.

4. The control circuit of claim 1 wherein the control circuit is operable to generate the comparison voltage a defined period of time after the constant reference voltage is determined.

5. The control circuit of claim 1 wherein the plurality of voltage ranges are contiguous ranges.

6. The control circuit of claim 1 wherein the plurality of voltage ranges are noncontiguous ranges.

7. The control circuit of claim 1 wherein the control circuit is operable to successively generate the comparison voltage, determine the constant reference voltage based on whether the generated comparison voltage falls within said one of the plurality of voltage ranges, and adjust the duty cycle.

8. The control circuit of claim 1 wherein the plurality of voltage ranges includes at least three voltage ranges.

9. The control circuit of claim 1 wherein the plurality of voltage ranges includes only three voltage ranges.

10. The control circuit of claim 1 wherein the plurality of voltage ranges includes at least four voltage ranges.

11. The control circuit of claim 1 wherein the plurality of voltage ranges includes only four voltage ranges.

12. The control circuit of claim 1 wherein the control circuit comprises a digital control circuit.

13. The control circuit of claim 1 wherein the control circuit comprises a proportional-integral-derivative (PID) control circuit.

14. The control circuit of claim 1 wherein the control circuit is operable to sense a temperature in the switched mode power supply and wherein the control circuit is operable to adjust the duty cycle of the control signal as a function of the sensed temperature.

15. A switched mode power supply comprising a power circuit and the control circuit of claim 1.

16. The switched mode power supply of claim 15 wherein the power circuit includes a full bridge converter.

17. The switched mode power supply of claim 15 wherein the power circuit includes an isolation transformer.

18. The control circuit of claim 1 wherein the control circuit is operable to determine the constant reference voltage without sensing the variable input voltage.

19. A method of regulating an output voltage of a switched mode power supply having a variable input voltage and at least one power switch, the method comprising:
generating a comparison voltage based on the output voltage of the switched mode power supply and an adjustable duty cycle of a control signal provided to the at least one power switch;
determining a constant reference voltage based on whether the generated comparison voltage falls within one of a plurality of voltage ranges, each voltage range associated with a different constant reference voltage; and
adjusting the duty cycle of the control signal provided to the at least one power switch of the switched mode power supply as a function of the determined constant reference voltage and the output voltage.

20. The method of claim 19 wherein generating the comparison voltage includes generating the comparison voltage based on a sensed input current of the switched mode power supply or a sensed output current of the switched mode power supply.

21. The method of claim 19 wherein generating the comparison voltage includes generating the comparison voltage a defined period of time after the constant reference voltage is determined.

22. The method of claim 19 wherein determining the constant reference voltage includes determining the constant reference voltage without sensing the variable input voltage.

* * * * *